United States Patent [19]

Peytavin

[11] Patent Number: 4,869,311

[45] Date of Patent: Sep. 26, 1989

[54] DEVICE PERMITTING INTRODUCTION OF A FLUID INTO THE COOLING CHAMBER OF A ROTARY MOULD

[75] Inventor: Pierre Peytavin, Neuilly-sur-Seine, France

[73] Assignee: Vallourec Industries, Paris, France

[21] Appl. No.: 207,049

[22] PCT Filed: Sep. 24, 1987

[86] PCT No.: PCT/FR87/00366

§ 371 Date: May 25, 1988

§ 102(e) Date: May 25, 1988

[87] PCT Pub. No.: WO88/02289

PCT Pub. Date: Apr. 7, 1988

[30] Foreign Application Priority Data

Sep. 25, 1986 [FR] France ............................ 86 13560

[51] Int. Cl.$^4$ ............................................. B22D 11/124
[52] U.S. Cl. ................................... 164/443; 164/297; 164/485
[58] Field of Search ............... 164/485, 486, 487, 443, 164/444, 422, 118, 297

[56] References Cited

U.S. PATENT DOCUMENTS

| | | | |
|---|---|---|---|
| 3,367,400 | 2/1968 | Hathorn | 164/422 |
| 3,589,435 | 6/1971 | Mougin | 164/297 |
| 3,718,178 | 2/1973 | Negre | 164/297 |
| 3,736,980 | 6/1973 | Peytavin et al. | 164/297 |
| 3,967,674 | 7/1976 | Fort | 164/297 |
| 4,019,565 | 4/1977 | Mola | 164/443 |

FOREIGN PATENT DOCUMENTS

1129739 10/1968 United Kingdom .

Primary Examiner—Richard K. Seidel
Attorney, Agent, or Firm—Dennison, Meserole, Pollack & Scheiner

[57] ABSTRACT

The device of the invention introduces cooling fluid to a rotary mould (41) surrounded by an annular cooling chamber (42). A non-rotatable annular box surrounds the outer wall of the annular chamber, and two annular nozzles (50, 51) rigid with the box (47) discharge in each case into an annular passage (57, 58) disposed between the outer wall and at least one non-rotatable wall rigid with the box. The fluid from the nozzles, after passing through the annular passage (57, 58), passes through an annular inlet zone (46), and through orifices (44, 45) into the annular cooling chamber (42).

12 Claims, 3 Drawing Sheets

DEVICE PERMITTING INTRODUCTION OF A FLUID INTO THE COOLING CHAMBER OF A ROTARY MOULD

The device and the method which are the objects of the invention relate to the cooling of rotary moulds used for the casting of liquids which are raised to high temperatures. The said device and the said method concern particularly moulds used for the rotary continuous casting of metals or alloys such as steels in order to obtain solid or hollow billets.

It is known to produce around a rotary mould a cooling chamber of which the outer wall, rigid with the mould, is connected to a fluid supply by means of introducing the said fluid.

BRIEF DESCRIPTION OF THE DRAWINGS

FIG. 1 shows a known device for the cooling of a rotary mould (1) which rotates about an axis (X—X) used for the rotary continuous casting of steel. The steel introducing means in the upper part and the means for withdrawing the billet during the course of solidification and positioned in the bottom part are known and are therefore not shown.

Figure 2:
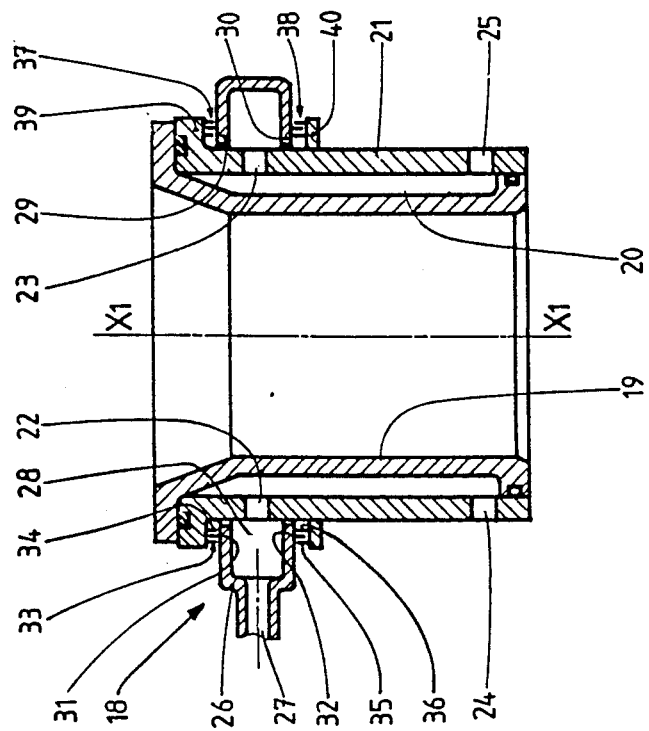
FIG. 2 : Prior art device for introducing fluid into the cooling chamber of a rotary mould comprising a labyrinthine controlled leakage seal.

In the drawing, the mould is adapted to revolve about the axis (X—X). The cooling chamber (2) is formed by the annular space comprised between the mould wall (1) and an outer wall (3) of revolution which surrounds it. This outer wall (3) comprises fluid inlet apertures such as (4, 5), likewise distributed according to a circumference of axis (X—X), in the vicinity of its upper end and fluid outlet orifices (6, 7) disposed in the vicinity of the bottom end.

The fluid inlet device (8) comprises a fixed annular box (9) mounted in known manner on a support, not shown. This box (9) of revolution surrounds the outer wall (3) at the height of the fluid inlet apertures (4, 5). The box (9) is connected by at least one inlet such as (10) to a cooling fluid supply duct which is known and which is not shown. The box (9) comprises an annular outlet orifice (11) of revolution disposed opposite the inlet apertures such as (4, 5) to the cooling chamber (2). The two edges (12, 13) of the outlet orifice (11) each comprise a lipped seal (14, 15). These seals bear in sliding fashion on the surface of revolution of the outer wall (3), respectively above and below the apertures such as (4, 5). They are orientated in such a way as to prevent emergence to the outside of fluid which passes through the space separating the outlet orifice (11) from the inlet apertures such as (4, 5).

Figure 1:
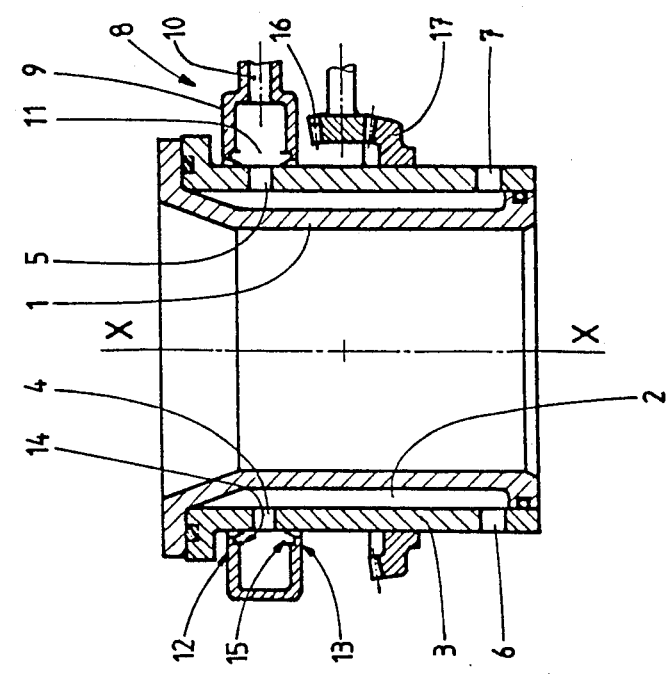
FIG. 1 : A prior art device for introducing fluid into the cooling chamber of a rotary mould comprising dynamic seals.

Thus it is possible to introduce into the cooling chamber (2) a fluid such as water from the annular box (9) without observing any substantial fluid losses. This fluid introducing device (8) does however have the serious disadvantage of substantially arresting rotation of the mould about the axis (X—X) due to friction exerted by the two lipped seals over the extent of their zone of annular contact with the wall (3). The higher the pressure, the greater this friction will be. It is therefore necessary, in order to cause the mould to rotate at the desired speed, to use a relatively powerful driving means which for example comprises a bevelled pinion mechanism (16) which meshes with a ring gear (17) mounted around the wall (3), a motor or a mechanical transmission not shown producing in known manner a rotation of the pinion (16). This mechanism increases the manufacturing costs and the cost of maintaining the casting machine. FIG. 2 shows a fluid introducing device (18) which makes it possible to avoid creating a substantial resistant torque which would oppose rotation of a rotary mould (19) and make it possible to simplify the construction of the casting machine as the bar is able to drive the ingot mould by friction. As in the case of FIG. 1, the rotary mould (19) of axis (XI—XI) is surrounded by a cooling chamber (20) of which the outer wall (21) comprises fluid intake apertures such as (22, 23) distributed according to a circumference of axis (XI—XI) in the vicinity of its upper end. Outlet orifices such as (24, 25) are disposed in the vicinity of the bottom end of this wall (21). The fluid introducing device (18) comprises a fixed annular box (26) supplied with fluid by at least one inlet aperture (27) connected to a fluid supply duct, not shown. The box (26) comprises an annular outlet orifice (28) disposed opposite fluid inlet apertures such as (22, 23) into the cooling chamber. The two edges (29, 30) of this orifice (28) are provided with fixed chicanes, respectively (31, 32), each of which co-operates with a set of two rotatingly driven chicanes respectively (33, 34 and 35, 36) in such a way as to form a labyrinth, respectively (37, 38).

Each of these two sets of rotatingly driven chicanes is mounted on a flange, (39, 40) respectively, rigid with the outer wall (21), respectively above and below inlet apertures (22, 23). These labyrinths (37, 38) act as limited fluid leakage seals. The more possible it is to provide a minimal clearance between fixed chicane and movable chicanes, the smaller the leakage will be. In practice, operating requirements call for clearances of several tenths of a millimeter between fixed and movable chicanes. Having regard to the large diameter of the flanges (39, 40) on which these labyrinths are mounted, a diameter which is more often than not 300 to 700 mm and the cooling fluid pressure which is most usually water, the fluid loss is normally 20 to 25% of the quantity of fluid used. This loss is extremely embarrassing because it occurs all around the casting installation and it is often difficult to recover the leakage.

Furthermore, it can happen that solid particles are entrained by the cooling fluid and become lodged between the fixed and moving chicanes. Such a happening can result in blocking the mould so that it cannot rotate, which thus cancels out all the advantages of simplicity provided by the rotary drive being provided by the bar itself. The idea has been researched of designing a device for introducing fluid into the cooling chamber of a rotary mould which allows the mould to rotate without any substantial braking by sliding seals such as for example lipped seals and which also makes it possible to minimise fluid losses at the level of the inlet apertures into the cooling chamber. The possibility has also been sought of avoiding risks of rotation of the mould being blocked by particles conveyed by the fluid and which become lodged between the fixed and movable parts of such a device, so making it possible to introduce the fluid into the cooling chamber.

The device which is the object of the invention makes it possible to introduce a cooling fluid into the cooling chamber of a rotary mould used for casting liquids raised to high temperatures, such as metals or alloys, without exerting any substantial braking on the rotary movement of the mould and with no risk of the mould becoming jammed. It also makes it possible to restrict to a very low level losses of fluid in the vicinity of the fluid inlets into the cooling chamber. This device is applied to the cooling of a rotary mould rotating about an axis of rotation, comprising a cooling chamber formed by the annular space located between the mould wall and an outer wall which surround it. It comprises fluid inlet apertures distributed annularly around the outer wall, in the vicinity of one of its ends, and discharging on the downstream side via the cooling chamber. On the upstream side, these apertures are preceded by a throat-like annular inlet zone of revolution in relation to the axis of rotation. This device likewise comprises an annular non-rotating box of revolution in relation to the axis of rotation surrounding the outer wall in the vicinity of the annular inlet zone and which is linked to a pressurised fluid supply via at least one supply aperture; two annular nozzles rotatable in respect of the axis of rotation are rigid with the box with which they communicate via their annular inlet apertures. Each comprises an annular outlet orifice which discharges into an annular passage comprised between the outer wall of the cooling chamber and at least one wall element which is non-rotating and which is rigid with the annular box. The upstream end of each of these two annular passages communicates with the outer space while the downstream end communicates with the throat-shaped annular inlet zone. The orifices of the nozzles are so disposed that the annular sheet of fluid which discharges from the nozzle is orientated in the direction of the downstream end of the annular passage. The fluid pressure in the box is adjusted so that the speed of displacement of the annular sheet of fluid at the discharge from each of the nozzles is at least 25 m/s. At the end opposite that at which the fluid inlet apertures are provided, the cooling chamber comprises at least one outlet orifice. Preferably, the total cross section of this or these outlet orifice(s) is determined so that the fluid pressure in the cooling chamber in the vicinity of the fluid inlet apertures is approx. 0.5 to 1.5 bars relative pressure. Advantageously, fluid collecting means are disposed in such a way as to collect the fluid in the vicinity of the outlet orifice(s). Advantageously, the width (e1) of the outlet orifice of each of the nozzles, in its narrowest part, is comprised between 0.6 mm and 1 mm. Likewise advantageously, the width (e2) of the annular passage downstream of the mouth of the nozzle and in its narrowest part is such that $e1 \leqq e2 \leqq 1.5\ e1$. Similarly advantageously, the width (e3) of the annular passage, upstream of the mouth of the nozzle is at most equal to (e2). The length (L1) of the annular passage downstream of the mouth of each nozzle is advantageously such that $L1 \geqq 5.e2$ and is preferably such that $L1 \geqq 8.e2$. Advantageously, at the level of each annular passage, at least downstream of the mouth of each nozzle, the outer surface of the outer wall of the cooling chamber is a cylinder of revolution and the same applies to the surface opposite the non-rotating wall rigid with the annular box. Advantageously, this surface of the non-rotating wall is extended downstream of each annular passage by an incurvate zone which directs the path of the fluid towards the throat-shaped annular inlet zone.

It is possible to combine the rotary movement of the mould with an alternating displacement parallel with its axis. In the event of the assembly constituted by the annular box and the nozzles remaining fixed, it is appropriate to increase the length (L1) by an amount equal to half the amplitude of alternating displacement.

The upper part of the outer wall of the cooling chamber may be demountable in order to facilitate positioning of the annular box and the nozzles. Similarly, the annular box may also be demountable.

The invention also relates to a method of introducing fluid into the annular cooling chamber of a rotary mould. In this method, at least one annular sheet of fluid is propelled from an annular orifice at a velocity of at least 25 m/s into an annular passage of which at least one of the walls is adapted to rotate in respect of the said orifice. The annular passage communicates with the outer space upstream of the orifice and, downstream of the orifice, communicates with an annular inlet zone formed in the outer wall of the cooling chamber upstream of the inlet apertures providing access to this chamber.

Preferably, the annular passage is of a length which is at least equal to that of the annular orifice and is not greater than one and a half times this latter. The length of the said passage is at least equal to 5 times and preferably 8 times its own length.

The cross section of the fluid outlet orifices from the cooling chamber and the rate of flow of at least one annular sheet of fluid are adjusted so that in the annular chamber in the vicinity of the inlet apertures, the fluid pressure is approx. 0.5 to 1.5 bars relative pressure.

The method is applicable particularly to the continuous casting of metals or alloys such as for example steels.

More often than not, the cooling fluid used is water which may or may not incorporate suitable additives.

The example and the drawings hereinafter describe but in no way restrict the scope of an embodiment of device according to the invention.

Figure 3:
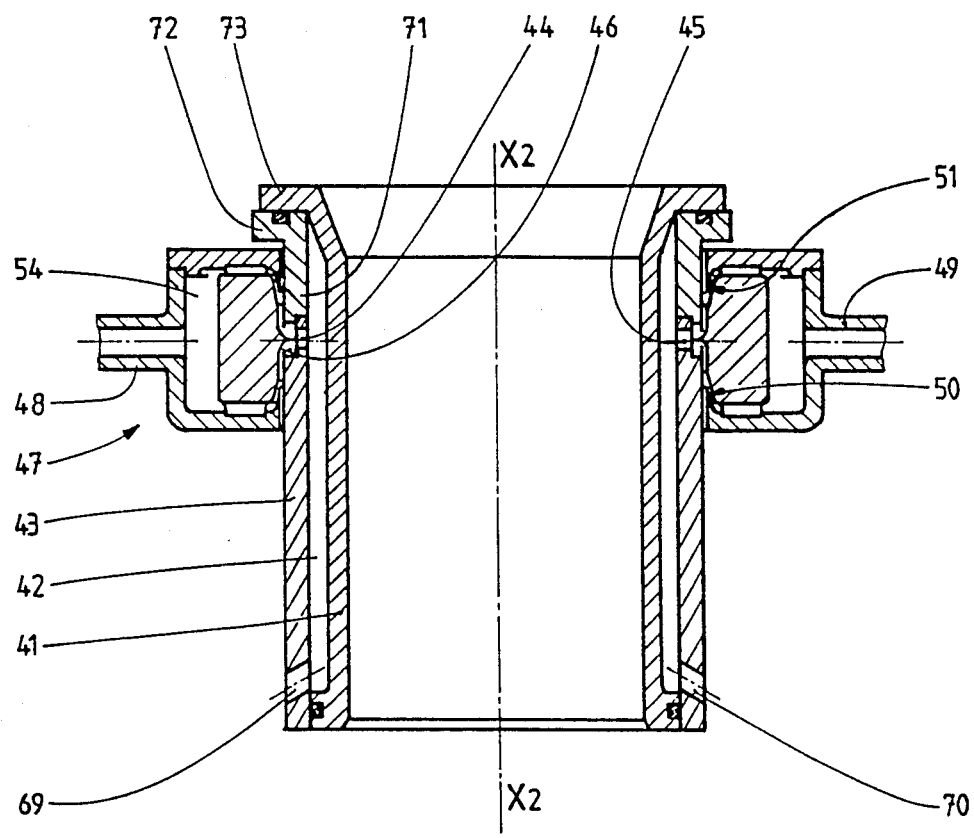
FIG. 3 shows an elevation and a cross section through a device according to the invention.
Figure 4:
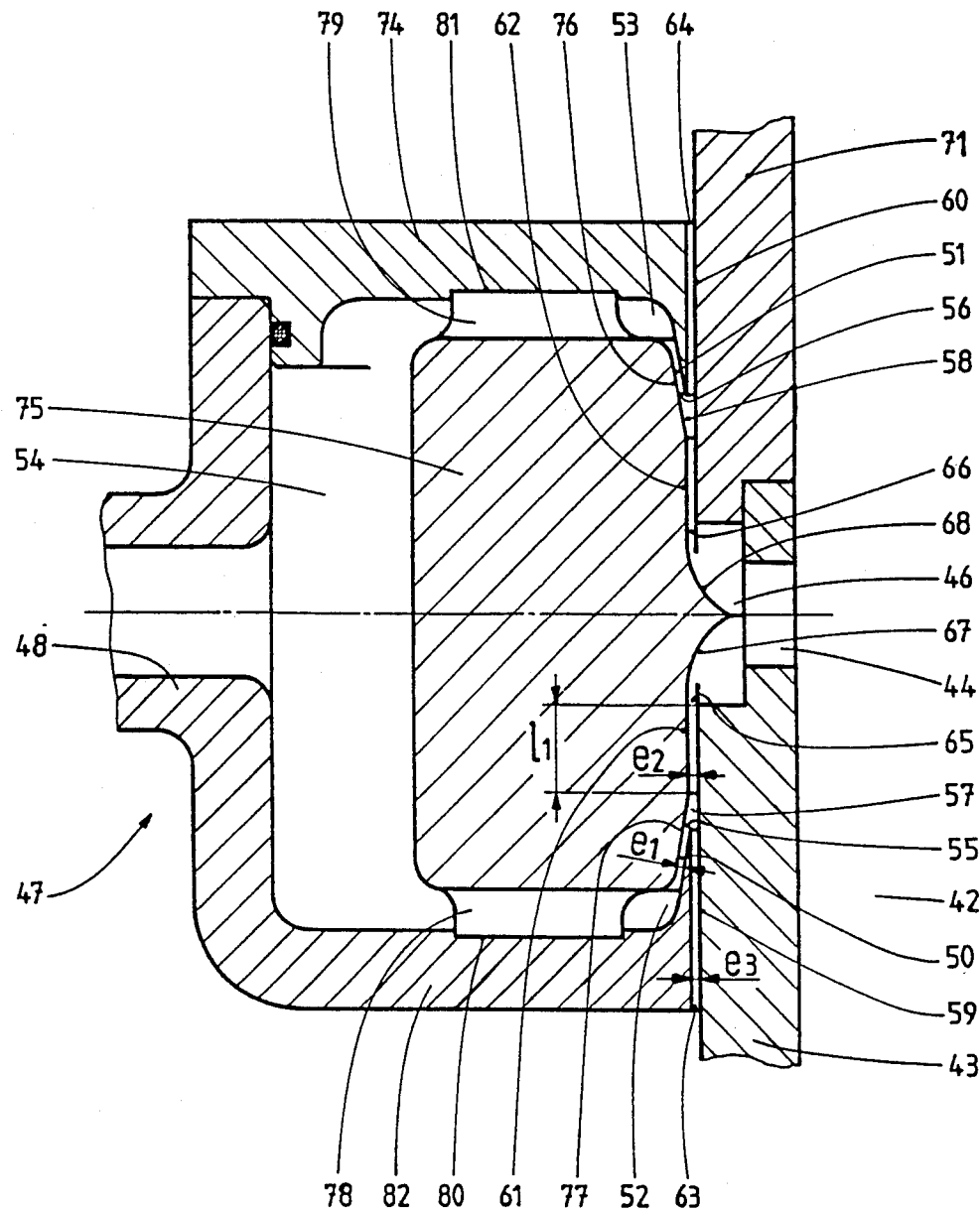
FIG. 4 shows an enlarged view of the left hand part of FIG. 3 at the level or the fluid introducing means.

The device according to the invention, shown in FIGS. 3 and 4, comprises a rotary mould (41) of circular cross section which rotates about an axis (X2—X2) by virtue of bearings of a known type, not shown, supported in known manner by a fixed structure, not shown. This mould is surrounded by an annular cooling chamber (42) of which the outer cylindrical and rotatable wall (43) comprises fluid inlet apertures such as (44, 45) distributed over a circumference in the vicinity of its upper end. These orifices discharge on the downstream side via the cooling chamber (42). On the upstream side, they are preceded by a throat-shaped annular inlet zone (46) adapted to rotate in respect of the axis (X2—X2). A non-rotatable annular box (47), a body of revolution in respect of the axis (X2—X2), mounted in known manner on a support, not shown, surrounds the outer wall (43) in the vicinity of the annular inlet zone. It is connected to a supply of pressurised cooling fluid such as for example water by two supply apertures (48, 49). Two annular nozzles (50, 51) of the same dimensions, adapted to rotate in relation to the axis (X2—X2) are rigid with the said box; their annular inlet apertures (52, 53) communicate with its interior (54) while their annular outlet orifices (55, 56) each discharge into an annular passage (57, 58) comprised between the rotatable outer wall (43) of the cooling chamber (59, 60) and the non-rotating wall elements (61, 62) which are rigid with the annular box. Each annular passage (57, 58) communicates by its upstream end (63, 64) with the outer space and by its downstream end (65, 66) with the annular inlet zone (46). The outlet orifices of the nozzles (55, 56) are so orientated that the annular sheet of fluid issuing from each nozzle traverses the corresponding annular passage in the direction of its downstream end. Preferably, each nozzle is inclined in respect of the corresponding annular passage by an angle not exceeding 15 degrees. Beyond the downstream end (65, 66) of each annular passage, the non-rotating wall comprises an incurvate zone (67, 68) which directs the path of fluid towards the annular inlet zone (46). The cooling chamber (42) comprises two fluid outlet orifices (69, 70) in the vicinity of its bottom end. Collecting means, not shown, such as an annular gutter, make it possible to collect the fluid issuing from these orifices and to carry it away. The total cross section of these outlet orifices (69, 70) is less than the total cross section of the inlet apertures such as (44, 45), so as to obtain in the top of the cooling chamber (42), in the vicinity of these inlet apertures, a fluid pressure which is approx. 0.5 to 1.5 bars relative pressure. Under these conditions, the annular inlet zone (46) is, under normal operating conditions, filled with fluid. To prevent delivery of the fluid in the direction of the upstream end of each of these passages, the dimensions of these latter, the cross section of the nozzle and the speed of travel of the sheet of fluid must be suitably adjusted. In the case of the present example, the width (e1) of the orifice of each nozzle in its narrowest zone, is 0.8 mm. The width (e2) of the annular passage downstream of the mouth of the nozzle is 1 mm over a length (L1) of 10 mm. Finally, the width (e3) of the annular passage upstream of the mouth of the nozzle is 0.8 mm. Under these conditions, by establishing a pressure of 3 to 5 bars relative pressure in the interior space (54) of the annular box (47), it is possible to obtain at the mouth of each nozzle (55, 56) a velocity of fluid in excess of 25 m/s which makes it possible to supply the cooling chamber under the desired conditions while making it possible to control delivery of fluid through the annular passages in the direction of their upstream ends (63, 64).

If necessary, the device makes it possible to combine with the rotary movement of the mould (41) an alternating displacement parallel with the axis (X2—X2). It is then observed that the movable wall of the annular passage slides on this axis in relation to the non-rotating wall. Then this annular passage must be of an average length (L1) increased by an amount corresponding to half the amplitude of the alternating displacement. If the amplitude of this oscillatory movement is for example 10 mm, then the length (L1) should be increased by 5 mm, which in the present example will increase (L1) to 15 mm. Instead of increasing this length, one might impart to the assembly (annular box plus nozzles) an alternating movement synchronised with that of the mould and of the same amplitude.

To allow positioning of the assembly formed by the annular box (47) and the nozzles (50, 51) around the outer wall (43) of the cooling chamber, the upper part (71) of the cooling chamber, comprising the flange (72) on which bears the flange (73) of the mould (41) can be dismantled. It is assembled by being nested together with the lower part, at the level of the annular inlet zone, as FIG. 4 shows. Known sealing and connecting means, not shown, join these two parts of the outer wall rigidly and in fluid-tight fashion. Similarly, the annular box (47) comprises an annular cover (74) which is demountable and which permits of positioning and replacement of the annular member (75) which forms the non-rotating wall elements (61, 62) of the annular passages (57, 58) downstream of the nozzles and also the incurvate extensions (67, 68) of these wall elements. This member (75) also forms one of the two walls (76, 77) of each nozzle (50, 51). It is maintained inside the box by relief members such as (78, 79) which are annularly distributed and which are of minimal thickness, being orientated radially in order not to disturb the supply of fluid to the nozzles. These relief members engage housings such as (80, 81) provided in the bottom wall (82) and in the lid (74) of the box (47). The lid is connected to the box in sealing tight manner by known means, not shown.

Many modifications may be made to the device according to the invention without departing from the scope thereof. In particular, the fluid introducing means which comprise the nozzles, the arrangement of the annular passages, the fluid inlet apertures and the annular inlet zone may be the subject of many adaptations. The fluid employed may be water with or without additives, or other fluids. The characteristic features of the nozzles, the clearances between fixed and movable parts, may also be the subject of many adaptations, particularly as a function of the fluids used.

The invention also relates to any casting method using a rotary mould and involving liquids at high temperature wherein a cooling fluid is introduced into an annular cooling chamber disposed around the mould. The method is applied particularly to the continuous casting of metals or alloys such as for example steels.

I claim:

1. A device for introducing a cooling fluid into the cooling chamber of a rotary mold for casting liquids raised to high temperatures, the cooling chamber being an annular space defined between a wall of the mold and an outer wall surrounding the mold wall, the outer wall having therein a plurality of cooling fluid inlet apertures distributed over its circumference, the center of which coincides with the axis of rotation of the rotary mold, and at least one fluid outlet orifice, said device comprising:
a non-rotatable annular box surrounding the outer wall in the vicinity of the fluid inlet apertures providing access to the cooling chamber;
means within said annular box defining a throat shaped annular inlet zone at said inlet apertures;
said annular box including therein at least one wall portion rigid therewith and located a predetermined distance from the exterior surface of the outer wall, fluid inlet means, and two annular nozzles, each having a fluid inlet orifice communicating with the fluid inlet means, and a fluid outlet orifice directed into an annular passage defined by the exterior surface of the outer wall and said wall portion rigid with the annular box, one portion of said passage communicating with the annular inlet zone, and another portion of said passage communicating with the exterior of the annular box, each outlet orifice being oriented at an angle with the corresponding annular passage such that fluid is discharged therefrom as a sheet directed in the portion of the passage toward the annular inlet zone.

2. Device according to claim 1, wherein the fluid inlet means communicates with a source of fluid of sufficient pressure such that the fluid at the outlet from each of the nozzles has a displacement velocity of at least 25 m/s.

3. Device according to claim 1 or 2, wherein the outlet orifice of each of the nozzles has a width e1, in its narrowest part, between 0.6 and 1 mm, and the corresponding annular passage between said outlet orifice and said annular inlet zone has a width e2, in its narrowest part, such that $e1 \leq e2 \leq 1.5(e1)$.

4. Device according to claim 3, wherein the portion of the annular passage between the outlet orifice and the exterior of the box has a width e3, in its narrowest part, at most equal to width e2.

5. Device according to claim 4, wherein the portion of the annular passage between each outlet orifice and the corresponding annular inlet zone has a length L1 such that $L1 \geq 5(e2)$.

6. Device according to claim 5, wherein the wall portion of each annular passage, between the outlet orifice and the corresponding annular inlet zone, is extended in the direction toward the inlet zone by an incurvate zone which directs the path of the fluid towards the annular inlet zone.

7. Device according to claim 5, wherein $L1 \geq 8(e2)$.

8. Device according to claim 1 or 2, wherein the portion of the annular passage between each outlet orifice and the exterior of the box has a width e3, in its narrowest part, at most equal to width e2.

9. Device according to claim 1 or 2, wherein the portion of the annular passage between the outlet orifice of each nozzle and the corresponding annular inlet zone has a length L1 such that $L1 \geq 5(e2)$.

10. Device according to claim 9, wherein $L1 \geq 8(e2)$.

11. Device according to claim 1 or 2, wherein the wall portion of each annular passage, between the outlet orifice and the corresponding annular inlet zone, is extended in the direction toward the inlet zone by an incurvate zone which directs the path of the fluid towards the annular inlet zone.

12. Device according to claim 1 or 2, wherein each said outlet orifice is oriented at an angle of not more than 15° with the corresponding annular passage.

* * * * *